United States Patent
Ekback et al.

(10) Patent No.: US 10,828,740 B2
(45) Date of Patent: Nov. 10, 2020

(54) METHOD OF DETERMINING PULL-OUT OF A CUTTING TOOL AND A ROTATABLE TOOL HOLDER FOR A CUTTING TOOL

(71) Applicant: SANDVIK INTELLECTUAL PROPERTY AB, Sandviken (SE)

(72) Inventors: Johan Ekback, Gavle (SE); Peter Eriksson, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 325 days.

(21) Appl. No.: 15/572,315

(22) PCT Filed: May 3, 2016

(86) PCT No.: PCT/EP2016/059826
§ 371 (c)(1),
(2) Date: Nov. 7, 2017

(87) PCT Pub. No.: WO2016/180666
PCT Pub. Date: Nov. 17, 2016

(65) Prior Publication Data
US 2018/0147684 A1   May 31, 2018

(30) Foreign Application Priority Data
May 8, 2015  (EP) .................................... 15166983

(51) Int. Cl.
*B23Q 17/22* (2006.01)
*B23B 31/02* (2006.01)
(Continued)

(52) U.S. Cl.
CPC ........ *B23Q 17/2225* (2013.01); *B23B 31/028* (2013.01); *B23B 31/305* (2013.01);
(Continued)

(58) Field of Classification Search
CPC .. B23Q 17/0952; B23Q 17/003; B23B 31/305
See application file for complete search history.

(56) References Cited

U.S. PATENT DOCUMENTS

| 5,878,495 A * | 3/1999 | Martens | ................. | B23Q 27/00 |
| | | | | 29/898.057 |
| 2007/0145932 A1* | 6/2007 | Kawai | .................... | B23Q 15/24 |
| | | | | 318/575 |

(Continued)

FOREIGN PATENT DOCUMENTS

| DE | 19959778 A1 | 6/2001 |
| DE | 102006016919 A1 | 10/2007 |

(Continued)

OTHER PUBLICATIONS

Erhard D: "Uberwachungssystem fur die Werkzeugplananlage: Kostengunstige, integrierte Sensorik", Werkstatt + Betrieb, vol. 145 No. 3, Mar. 1, 2012, pp. 18-20.

*Primary Examiner* — Alvaro E Fortich
(74) *Attorney, Agent, or Firm* — Corinne R. Gorski

(57) ABSTRACT

A method of determining pull-out of a cutting tool mounted in a rotatable tool holder includes the steps of rotating the tool holder and thus the cutting tool, machining a work piece with the rotating cutting tool, measuring an axial position of the cutting tool in the tool holder during machining by a position sensor in the tool holder, calculating an axial displacement from an initial position of the cutting tool by the measured axial position, and determining pull-out of the cutting tool when the axial displacement exceeds a threshold value. A rotatable tool holder for a cutting tool, a machine tool system including a rotatable tool holder and use of the tool holder and machine tool system is also provided.

24 Claims, 4 Drawing Sheets

(51) Int. Cl.
  *B23B 31/30*    (2006.01)
  *B23Q 17/00*    (2006.01)
  *B23Q 17/09*    (2006.01)

(52) U.S. Cl.
  CPC ....... *B23Q 17/003* (2013.01); *B23Q 17/0952*
     (2013.01); *B23B 2260/048* (2013.01); *B23B*
         *2260/0482* (2013.01); *B23B 2260/128*
                                         (2013.01)

(56) References Cited

U.S. PATENT DOCUMENTS

| | | |
|---|---|---|
| 2010/0188282 A1 | 7/2010 | Bonerz et al. |
| 2010/0294097 A1* | 11/2010 | Aoki .................... A01D 34/828 83/58 |
| 2013/0190921 A1* | 7/2013 | Maekawa ............ G05B 19/404 700/177 |
| 2016/0290906 A1* | 10/2016 | Rancic .................... G01N 3/56 |

FOREIGN PATENT DOCUMENTS

| | | |
|---|---|---|
| EP | 1112810 A1 | 7/2001 |
| EP | 1042097 B1 | 5/2003 |
| EP | 2357444 A1 | 8/2011 |
| EP | 3015601 A1 | 10/2015 |
| JP | S58103305 U | 7/1983 |
| JP | S5953108 A | 3/1984 |
| JP | H0550359 A | 3/1993 |
| JP | 2002193417 A | 7/2002 |
| JP | 2012112751 A | 6/2012 |
| JP | 201684224 A | 5/2016 |
| JP | 2016175726 A | 10/2016 |

\* cited by examiner

METHOD OF DETERMINING PULL-OUT OF A CUTTING TOOL AND A ROTATABLE TOOL HOLDER FOR A CUTTING TOOL

Related Application Data

This application is a § 371 National Stage Application of PCT International Application No. PCT/EP2016/059826 filed May 3, 2016 claiming priority to EP Application No. 15166983.5 filed May 8, 2015.

TECHNICAL FIELD

The invention relates to a method of determining pull-out of a cutting tool in a rotatable tool holder, a rotatable tool holder for a cutting tool, a machine tool system and use of a rotatable tool holder.

BACKGROUND ART

Cutting tools such as milling tools, drilling tools etc. may be used for chip removing machining of metal work pieces. Such tools are held by rotatable tool holders and are rotated to cut into a work piece. During operation of the tool it is important that the tool is correctly held by the tool holder in order to maintain a high machining quality and not damaging the work piece.

During machining, e.g. in milling applications, forces will act on the tool in the axial direction of the rotating tool. The tool may be held in the tool holder by frictional forces, but if these frictional forces are overcome by the axial forces acting on the tool it may be pulled out of the holder. This is called "pull-out" or "tool slip". As a consequence of pull-out, it may be difficult to maintain specified tolerances on the machined work pieces, which in worst case will need to be scraped. Furthermore, there is a risk of tool breakage and also damages on the machine spindle.

The problem with pull-out has been addressed by improvements relating to the gripping function of the tool holder, e.g. to further reduce the risk of tools slipping out of the tool holder. However, if there is an actual displacement of the cutting tool in the tool holder, e.g. during a pull-out, there is yet no way of detecting this.

SUMMARY

It is an object of the invention to alleviate the shortcomings of prior art and to reduce detrimental effects of pull-out of cutting tools during machining.

Thus the invention relates to a method of determining pull-out of a cutting tool mounted in a rotatable tool holder. The method comprises rotating the tool holder and thus the cutting tool, and machining a work piece with the rotating cutting tool. During machining, an axial position of the cutting tool in the tool holder is measured by means of a position sensor in the tool holder. An axial displacement from an initial position of the cutting tool is calculated by the measured axial position. Pull-out of the cutting tool is determined when the axial displacement exceeds a threshold value.

By the method an axial displacement of the cutting tool in the tool holder may be determined during machining from the measurements of axial position of the cutting tool in the tool holder. Thus, if the cutting tool starts slipping in the tool holder during machining, also called pull-out, the machine or the operator of the machine may take action before the consequences of the slippage is detrimental. The axial displacement threshold value for detecting pull-out may be set in relation to the dimensions of the cutting tool or the tool holder, and may e.g. be 5 mm, 2 mm, 1 mm, 0.5 mm or less.

The method may comprise transmitting an output signal from the tool holder during machining with the cutting tool, based on the axial position of the cutting tool in the axial space. For example, the method may comprise transmitting an output signal comprising axial position data during machining and receiving the output signal for calculation of the axial displacement. The output signal may be transmitted from the rotatable tool holder and received by an external unit wherein the axial displacement is calculated.

Thus, the output signal comprising axial position data may be received and processed by a unit external to the rotatable tool holder to calculate an axial displacement and determine pull-out of the cutting tool.

The step of calculating an axial displacement may be performed by a unit in the rotatable tool holder. The method may further comprise transmitting an output signal comprising axial displacement data during machining and receiving the output signal for determining pull-out of the cutting tool. The output signal may be transmitted from the rotatable tool holder and received by an external unit wherein the step of determining pull-out is performed.

Thus the output signal comprising axial displacement data may be received and processed by a unit external to the rotatable tool holder to determine pull-out of the cutting tool.

The step of determining pull-out of the cutting tool may be performed by a unit in the rotatable tool holder. The method may further comprise transmitting an output signal comprising a pull-out signal when pull-out is determined.

Thus the processing needed to determine pull-out may be performed in the rotatable tool holder and the output signal may be a digital pull-out signal (i.e. no pull-out/pull-out) transmitted to an operator of the machine or an external control unit.

The output signal may be transmitted intermittently at a frequency of at least 1 Hz, at least 100 Hz or at least 1 kHz. Alternatively the output signal may be transmitted continuously, e.g. in the form of an analogue position or displacement data signal or in the form of a digital pull-out signal (i.e. no pull-out/pull-out).

The output signal may be transmitted wirelessly from the rotatable tool holder. Wireless transmission comprises e.g. optical or radio-based (e.g. Wi-Fi or Bluetooth) transmission technology. Thus there is no need to transmit the output signal by wire between rotatable and stationary parts. Alternatively, the output may be transmitted over wire, e.g. via rotary electrical interfaces such as slip ring interfaces.

The method may comprise displacing the tool holder a distance axially away from the work piece, the distance corresponding to the axial displacement of the cutting tool, to compensate for the pull-out of the cutting tool.

Thus, a smaller displacement of the cutting tool may be compensated to maintain specified tolerances of the work piece. The displacement may be smaller than the threshold for determining pull-out.

The method may comprise stopping the rotation of the tool holder and thus the cutting tool when pull-out of the cutting tool is determined.

Thus, the cutting may be discontinued if pull-out of the cutting tool is determined to reduce the risk of damage of the work piece, the cutting tool or the machine.

The method may comprise releasing the cutting tool in the tool holder and stopping the rotation of the tool holder when pull-out of the cutting tool is determined.

Thus, the rotation of the cutting tool may be stopped quickly by reducing the rotating inertial mass which needs to be stopped. Also, the released cutting tool may stop rotating quicker.

The method may be performed during a milling operation with the cutting tool. There is a great need for detecting pull-out during milling since the axial forces acting on the cutting tool are not balanced by counteracting forces from the work piece. Alternatively, the method may be performed e.g. during drilling operations.

The invention further relates to a rotatable tool holder for a cutting tool, comprising an axial space for receiving an end portion of a cutting tool. A holding means is arranged for holding the end portion of a cutting tool in the axial space. A position sensor is comprised in the rotatable tool holder and configured to measure an axial position of the cutting tool in the axial space. The tool holder further comprises a transmitter for transmitting an output signal from the tool holder during machining with the cutting tool, based on the axial position of the cutting tool in the axial space.

The axial position of the cutting tool in the axial space measured by the position sensor is to be used for calculating an axial displacement from an initial position of the cutting tool and determining pull-out of the cutting tool when the axial displacement exceeds a threshold value during machining with the cutting tool.

Thus, a rotatable tool holder for a cutting tool is provided which makes it possible to, during machining, detect pull-out of a cutting tool received in the axial space and held by the holding means. An axial displacement of the cutting tool in the tool holder may be determined during machining from the measurements of axial position of the cutting tool by the position sensor in the tool holder. Thus, if the cutting tool starts slipping in the tool holder during machining, the machine or the operator of the machine may take action before the consequences of the slippage is detrimental The output signal may comprise axial position data. Thus the output signal comprising axial position data may be received and processed by a unit external to the rotatable tool holder to calculate an axial displacement and determine pull-out of the cutting tool.

The rotatable tool holder may comprise a processing unit configured for calculating an axial displacement from an initial position of the cutting tool by the measured axial position. The output signal may thus comprise axial displacement data. The output signal comprising axial displacement data may be received and processed by a unit external to the rotatable tool holder to determine pull-out of the cutting tool.

The processing unit may be configured for determining pull-out of the cutting tool when the axial displacement exceeds a threshold value, and wherein the output signal comprises a pull-out signal. Thus the processing needed to determine pull-out may be performed in the rotatable tool holder and the output signal may be a digital pull-out signal (i.e. no pull-out/pull-out) transmitted to an operator of the machine or an external control unit.

The sensor may be an inductive position sensor. Thus the position may be measured precisely with a sensor which may be integrated in the tool holder. Alternatively the sensor may be a capacitive, mechanical or optical position sensor.

The rotatable tool holder may be for a cutting tool comprising electrically conducting material and the sensor may comprise an electromagnetic coil arranged such that when the cutting tool is displaced in the axial space, a current is induced in the coil. Thus, the position may be measured with high accuracy with relatively inexpensive components.

The electromagnetic coil may comprises a core and the core may be formed as a threaded set screw held in the tool holder, such that the set screw defines an axially adjustable stop for the cutting tool in the axial space. Thus, the default position of the cutting tool in the axial space may be defined by the set screw, and this default position may thus be adjustable.

The rotatable tool holder may comprise a measurement circuit configured to measure an equivalent parallel resonance impedance of the electromagnetic coil to measure the axial position of the cutting tool in the axial space. Thus the position may be measured with high accuracy with relatively inexpensive components.

The rotatable tool holder may comprise a cutting tool having an end portion that is received in the axial space where it is held by the holding means. The cutting tool may comprise electrically conductive material.

The invention further relates to a machine tool system comprising a machine tool with a rotatable tool holder as disclosed herein, a receiver for receiving the output signal from the rotatable tool holder, and a controller for controlling the machine with the rotatable tool holder, based on the output signal.

Thus, the machine, the rotatable tool holder, and thereby the movement of a cutting tool used in the machine tool system may be controlled by the measurements on axial position of the cutting tool in the tool holder. Thus, if the cutting tool starts slipping in the tool holder during machining, the controller may take action before the consequences of the slippage is detrimental.

The controller may be configured to displace the tool holder a distance axially away from the work piece, the distance corresponding to the axial displacement of the cutting tool, to compensate for the pull-out of the cutting tool.

Thus, a smaller displacement of the cutting tool may be compensated to maintain specified tolerances of the work piece. The displacement may be smaller than the threshold for determining pull-out.

The controller may be configured to stop the rotation of the tool holder and thus the cutting tool when pull-out of the cutting tool is determined.

Thus, the cutting may be discontinued if pull-out of the cutting tool is determined to reduce the risk of damage of the work piece, the cutting tool or the machine.

The controller may be configured to release the cutting tool in the tool holder and stopping the rotation of the tool holder when pull-out of the cutting tool is determined.

Thus, the rotation of the cutting tool may be stopped quickly by reducing the rotating inertial mass which needs to be stopped. Also, the released cutting tool may stop rotating quicker.

The controller may be configured to transmit a pull-out warning signal to a machine operator when pull-out of the cutting tool is determined. Thus the operator may be adverted by the pull-out of the cutting tool to take necessary action.

The invention further relates to a use of the rotatable tool holder or the system as disclosed herein for detecting pull-out of a cutting tool during a milling operation with the cutting tool.

The methods and systems described herein may be embodied by a computer program or a plurality of computer programs. Thus, an inventive computer program can have instructions which, when executed by a computing device or system, cause the computing device or system to perform a described method. The system may be of a kind as described in this invention.

The computer program may exist in a variety of forms both active and inactive in a single computer system or across multiple computer systems. For example, the computer program may exist as a software program comprised of program instructions in source code, object code executable code or other formats for performing some of the steps. Any of these may be embodied on a computer readable medium, which include storage devices and signals in compressed or uncompressed form.

DETAILED DESCRIPTION OF EMBODIMENTS

Figure 1:
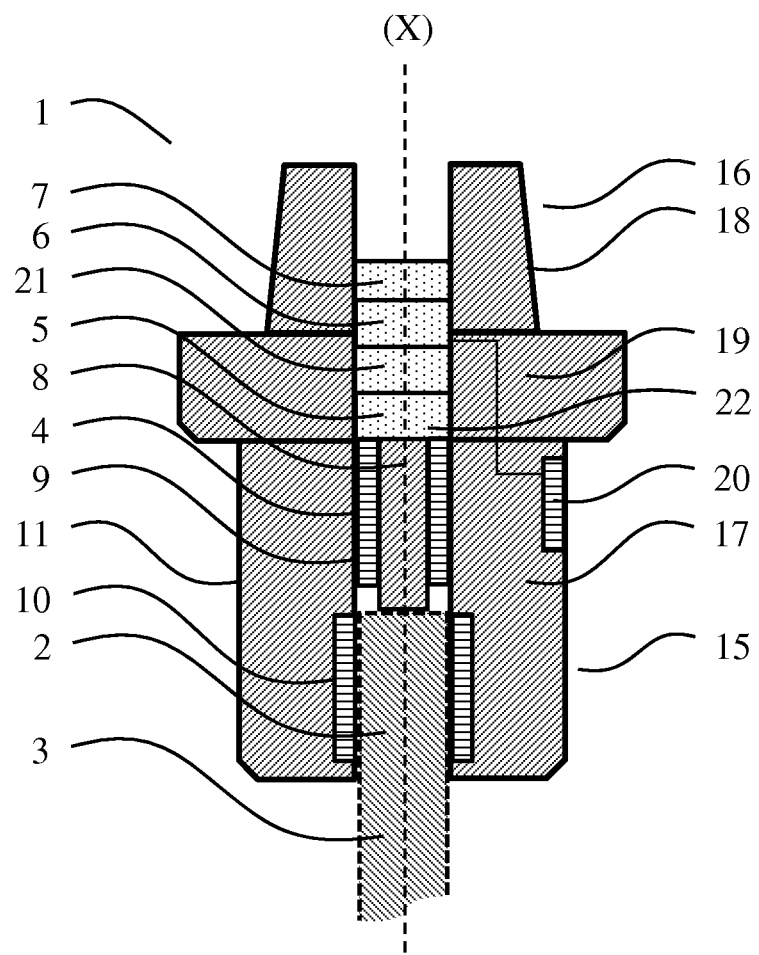
FIG. 1 shows an example of a rotatable tool holder for a cutting tool.

One example of a rotatable tool holder 1 for a cutting tool 3 is shown in FIG. 1. This example shows a tool holder, in this case a chuck, for a cutting tool such as a milling tool. The tool holder is rotatable, having an axis of rotation X. The tool holder comprises a tool holder body 11 having a front portion 15 and a rear portion 16 and extends along the axis X. The front portion of the tool holder comprises a holder portion 17 forming an axial space 2 for receiving an end portion of a cutting tool 3. The axial space has a generally circular cylindrical shape for receiving a circular cylindrical end portion of the cutting tool. The cutting tool is held in the tool holder by a hydraulic holding means 10 in the form of an annular membrane covering a cavity which may be pressurized by hydraulic liquid. Thereby the annular membrane is deformed by the pressurized hydraulic liquid to hold the cutting tool in the holder. The holding means can be of another suitable type, such as for example an interlocking form of the holding means and the cutting tool.

The rear portion 16 of the tool holder body 11 comprises a coupling interface 18 for connecting the tool holder to the spindle of a machine. The coupling interface may comprise a tapered polygon conical portion and a flange portion 19, and may e.g. be a Sandvik Coromant Capto® coupling, a HSK coupling or an ISO coupling.

The cutting tool 3 is electrically conducting, i.e. is made of or comprises electrically conducting material, at least in the end portion of the cutting tool. The electrically conducting material may e.g. be high speed steel or cemented carbide (tungsten). Alternatively, an electrically conductive piece of material is attached to the end portion of the cutting tool.

The tool holder comprises a threaded set screw 8 which is adjustable to define an axial end position of the cutting tool in the axial space of the tool holder. Typically the end portion is inserted in the axial space abutting against the set screw 8. It is thus desirable to detect any axial movement from this fully inserted and initial position of the cutting tool in the tool holder during machining, i.e. pull-out of the cutting tool from the tool holder.

The tool holder comprises a position sensor 22 comprising an electromagnetic coil circuit with an electromagnetic coil 4, and a measurement circuit 5. The coil circuit may comprise other components such as inductors, capacitors etc. The coil circuit may comprise e.g. an inductive component and a capacitive component connected in parallel, thus forming a resonator circuit. The electromagnetic coil 4 is in the form of a helical coil having an extension in the axial direction X of the tool holder. Alternatively the coil may be a flat spiral coil or a coil of another shape. In the example shown, the coil is axially aligned with the cutting tool, and arranged axially outside the end portion of the cutting tool. The set screw 8 is threaded inside the coil 4 and is electrically conducting to form part of a core of the electromagnetic coil. Alternatively, the end portion of the cutting tool extends inside the helical cylindrical coil.

The measurement circuit 5 may e.g. comprise a Texas Instruments LDC1000 inductance converter. The measurement circuit may thus be configured to measure the equivalent parallel resonance impedance of the coil circuit in order to measure the axial position of the cutting tool in the axial space of the tool holder.

The tool holder further comprises a processing unit 21 for receiving axial position data from the measurement circuit 5 and calculating an axial displacement from an initial position of the cutting tool by data of the measured axial position of the cutting tool.

The tool holder further comprises a transmitter 6 for wireless transmission of an output signal from the tool holder. The transmitter is connected to an antenna 20 situated on the outside of the tool holder for transmission of data from the tool holder. The electronic circuits integrated in the tool holder are powered by an integrated power source 7, e.g. in the form of a battery, in the tool holder.

Figure 2:
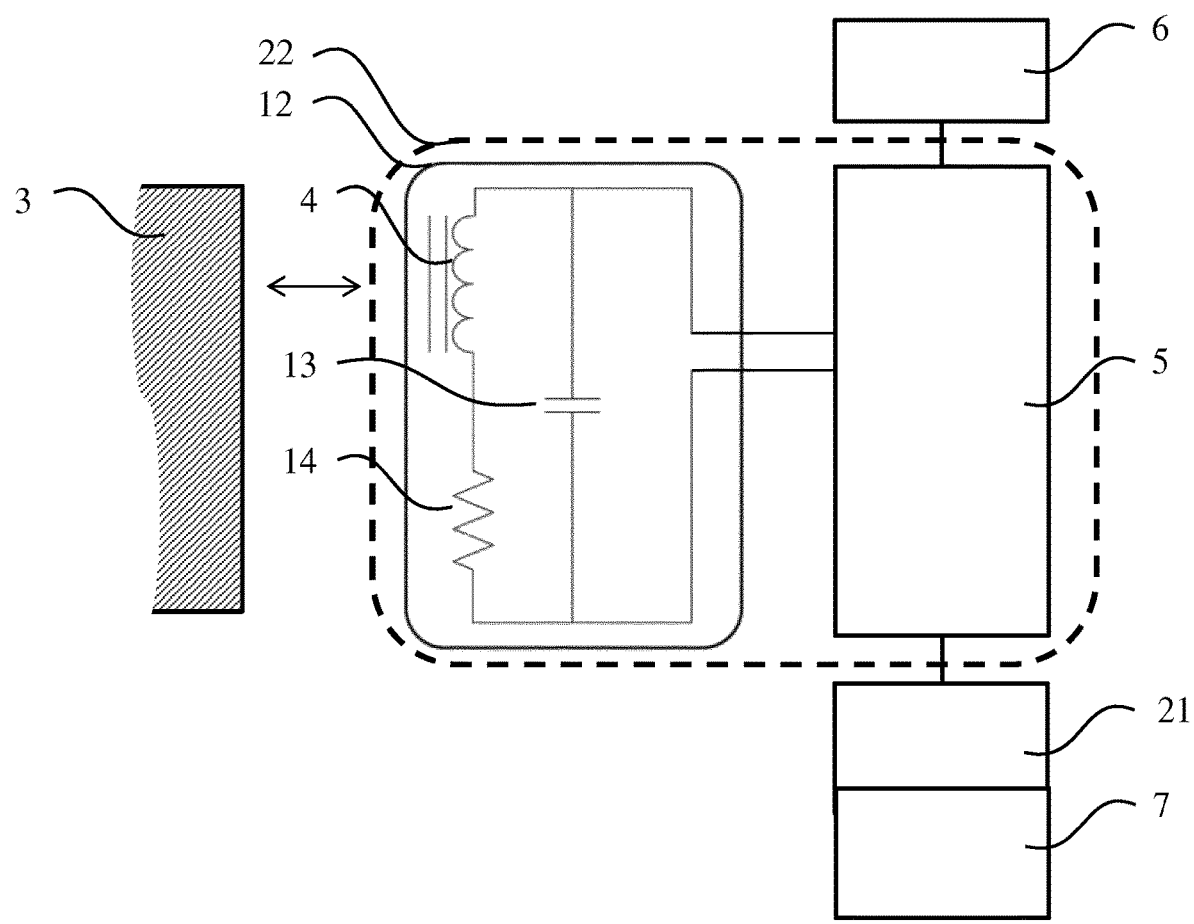
FIG. 2 shows an example of electrical circuits of the tool holder.

The electrical circuits of the tool holder are further illustrated in FIG. 2. In this figure the position sensor 22 is shown with the coil circuit 12 and the measurement circuit 5. The coil circuit 12 is schematically shown with the electromagnetic coil 4, a capacitor 13 in parallel connection with the coil, and an inherent or added resistive component 14. The coil circuit is connected to the measurement circuit 5, configured as a position sensor, for measuring the position of the cutting tool.

During operation of the position sensor 22, the coil circuit is excited by the measurement circuit 5 to provide an alternating magnetic field of the coil. By providing a resonant coil circuit with a capacitor 13 in parallel with the coil 4, the energy consumption may be held low. The excited magnetic field of the electromagnetic coil 4 induces eddy currents in the electrically conducting cutting tool 3. These eddy currents generate their own magnetic field which opposes the original magnetic field of the electromagnetic coil. Thereby the cutting tool is inductively coupled to the electromagnetic coil of the coil circuit. This coupling is dependent on e.g. the distance between the electromagnetic coil of the tool holder and the cutting tool itself. The inductively coupled cutting tool thus can be seen as a distance dependent parasitic series resistance 14 and inductance 4 of the coil circuit 12. By measuring the equivalent parallel resonance impedance of the coil circuit the axial position of the cutting tool 3 with respect to the electromagnetic coil 4 may be measured in order to calculate an axial displacement of the cutting tool into or out from the space of the tool holder.

The transmission circuit may be configured to continuously or intermittently transmit data relating to the axial position of the cutting tool in tool holder. Alternatively, the transmission circuit may be configured to transmit pull-out alert messages if a pull-out of the cutting tool is determined during machining operation. The data or the alert messages may be received by a control unit, connected to the machining system driving the tool holder. Thereby, upon detection of pull-out of the cutting tool from the tool holder during operation, the machining operation may be interrupted to save the workpiece, the tool and/or the machine itself.

Figure 3:
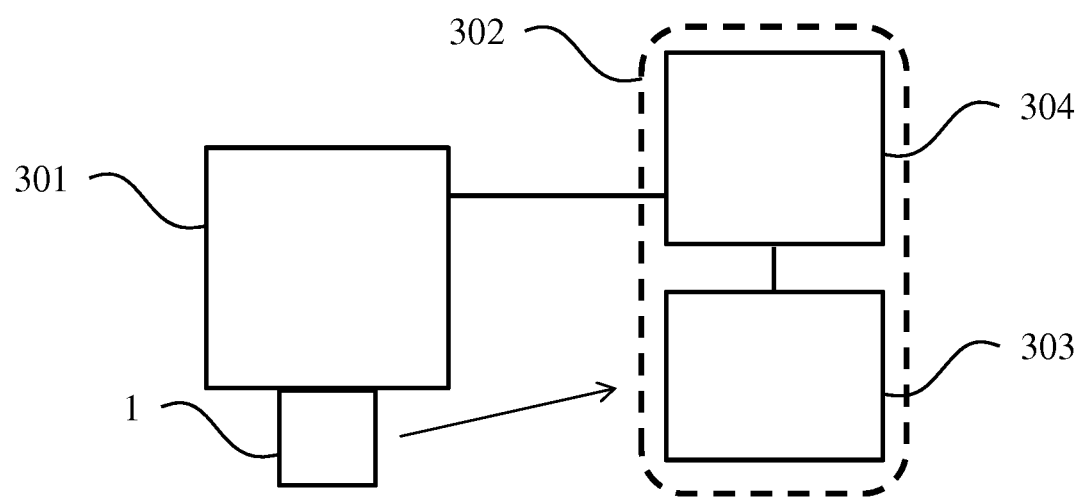
FIG. 3 shows a machine tool system comprising a machine tool with a rotatable tool holder and a controller for controlling the machine.

In FIG. 3 a machine tool system is shown comprising a machine tool 301 with a rotatable tool holder 1 as disclosed herein. The system comprises an external unit 302 comprising a receiver 303 for receiving the output signal from the rotatable tool holder, connected to a controller 304 for controlling the machine with the rotatable tool holder, based on the received output signal. The system is configured for performing the method disclosed herein. To this end, the system can include a computer program, which when executed causes the system to perform the method disclosed herein.

Figure 4:
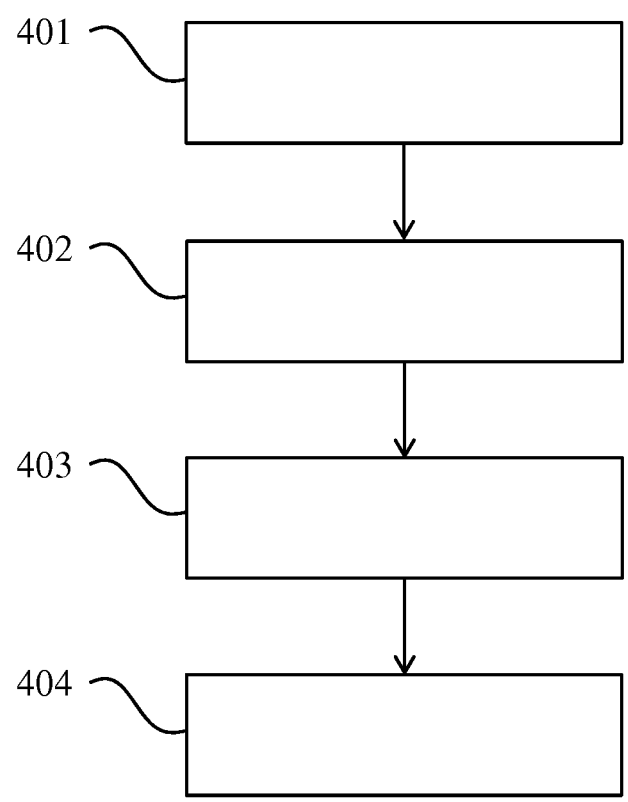
FIG. 4 shows steps of a method of determining pull-out of a cutting tool mounted in a rotatable tool holder.

A method of determining pull-out of a cutting tool mounted in a rotatable tool holder is described in relation to FIG. 4. The method is performed while rotating the tool holder and thus the cutting tool, and machining a work piece with the rotating cutting tool.

During machining, the axial position of the cutting tool in the tool holder is measured 401, by means of a position sensor in the tool holder.

By the measured axial position, an axial displacement from an initial position of the cutting tool is calculated 402. The initial position may e.g. be the default position of the cutting tool, fully inserted in the tool holder and typically in contact with the setting screw in the tool holder.

Pull-out of the cutting tool is then determined 403 when the axial displacement exceeds a threshold value. The threshold value may be set in respect to the dimensions of the cutting tool or the tool holder. The axial displacement threshold value for determining pull-out may be set in relation to the dimensions of the cutting tool or the tool holder, and may e.g. be 5 mm, 2 mm, 1 mm, 0.5 mm or less.

The steps of measuring axial position, calculating an axial displacement and determining pull-out of the cutting tool may be performed in the tool holder, wherein the tool holder comprises a processing unit for performing these calculating steps. An output signal in the form of a pull-out alert signal may then be transmitted from the tool holder when pull-out is determined.

Alternatively, the step of calculating an axial displacement may be performed in the tool holder and axial displacement data transmitted from the tool holder as an output signal. These data may then be received by an external unit comprising a receiver, e.g. a controller for a machine comprising the tool holder. The step of determining pull-out may then be performed in the external unit.

As a further alternative, data on the axial position of the cutting tool in the tool holder may be transmitted from the tool holder as an output signal and received in an external unit. The steps of calculating an axial displacement of the cutting tool and determining pull-out may then be performed in the external unit.

Thus, data may be transmitted as output signals from the tool holder as axial position data, as calculated axial displacement data, or as alerts that pull-out of the cutting tool has been determined. The output signal may be transmitted intermittently from the tool holder at a frequency of at least 1 Hz, preferably by wireless transmission.

Thereafter, based on the steps of calculating the axial displacement and determining pull-out, various actions 404 may be taken. As a first alternative, the tool holder may be displaced a distance axially away from the work piece, corresponding to the axial displacement of the cutting tool, to compensate for the pull-out of the cutting tool. This may alternatively be performed already before the axial displacement threshold is reached, to compensate for smaller axial displacements of the cutting tool. Thereby the tolerances of the work piece may be maintained even if a small degree of tool slip is present.

If pull-out is determined, the rotation of the tool holder and thus the cutting tool may be stopped. Thereby the machining process may be halted and the problem with pull-out of the cutting tool may be handled, e.g. by the operator or by the machine. This may be done before any detrimental damage is made to the work piece, the cutting tool and/or the machine.

Alternatively, the cutting tool may be released in the tool holder and the rotation of the tool holder stopped when pull-out of the cutting tool is determined. By releasing the cutting tool, the amount of rotational energy that may cause damage to the work piece is much reduced, and the rotation of the cutting tool is stopped very quickly.

Typically the method described herein is performed during a milling operation with the cutting tool. Alternatively the method may be performed during e.g. drilling with a cutting tool.

The invention claimed is:

1. A method of determining pull-out of a cutting tool mounted in a rotatable tool holder, the method comprising:
    rotating the tool holder and the cutting tool;
    machining a work piece with the rotating cutting tool;
    measuring an axial position of the cutting tool in the tool holder during machining with a position sensor located in the tool holder;
    calculating an axial displacement from an initial position of the cutting tool by the measured axial position; and
    determining pull-out of the cutting tool when the axial displacement exceeds a threshold value.

2. The method according to claim 1, further comprising transmitting an output signal including axial position data during machining and receiving the output signal for calculation of the axial displacement.

3. The method according to claim 1, further comprising transmitting an output signal including axial displacement data during machining and receiving the output signal for determining pull-out of the cutting tool.

4. The method according to claim 1, further comprising transmitting an output signal including a pull-out signal when pull-out is determined.

5. The method according to claim 3, wherein the output signal is transmitted intermittently at a frequency of at least 1 Hz.

6. The method according to claim 3, wherein the output signal is transmitted wirelessly from the rotatable tool holder.

7. The method according to claim 1, further comprising displacing the tool holder a distance axially away from the work piece, the distance corresponding to the axial displacement of the cutting tool, to compensate for the pull-out of the cutting tool.

8. The method according to claiml, further comprising stopping the rotation of the tool holder and thus the cutting tool when pull-out of the cutting tool is determined.

9. The method according to claiml, further comprising releasing the cutting tool in the tool holder and stopping the rotation of the tool holder when pull-out of the cutting tool is determined.

10. The method according to claim 1, wherein the method is performed during a milling operation with the cutting tool.

11. A computer program having instructions, which when executed by a computing device or system cause the computing device or system to perform the method according to claim 1.

12. A rotatable tool holder for a cutting tool, the tool holder comprising:
an axial space for receiving an end portion of a cutting tool;
a holding means arranged to hold the end portion of the cutting tool in the axial space;
a position sensor arranged in the rotatable tool holder and configured to measure an axial position of the cutting tool in the axial space; and
a transmitter arranged to transport an output signal from the tool holder during machining with the cutting tool, based on the axial position of the cutting tool in the axial space, wherein the processing unit is configured for determining pull-out of the cutting tool when the axial displacement exceeds a threshold value, and wherein the output signal includes a pull-out signal.

13. The rotatable tool holder according to claim 12, wherein the output signal includes axial position data.

14. The rotatable tool holder according to claim 12, further comprising a processing unit configured for calculating an axial displacement from an initial position of the cutting tool by the measured axial position.

15. The rotatable tool holder according to claim 14, wherein the output signal includes axial displacement data.

16. The rotatable tool holder according to claim 13, wherein the sensor is an inductive position sensor.

17. The rotatable tool holder according to claim 16, wherein the cutting tool includes electrically conducting material, the sensor including an electromagnetic coil arranged such that when the cutting tool is displaced in the axial space, a current is induced in the coil.

18. The rotatable tool holder according to claim 17, wherein the electromagnetic coil includes a core and wherein the core is formed as a threaded set screw held in the tool holder, such that the set screw defines an axially adjustable stop for the cutting tool in the axial space.

19. The rotatable tool holder according to claim 17, further comprising a measurement circuit configured to measure an equivalent parallel resonance impedance of the electromagnetic coil to measure the axial position of the cutting tool in the axial space.

20. A machine tool system comprising
a machine tool with a rotatable tool holder according to claim 12;
a receiver arranged to receive the output signal from the rotatable tool holder; and
a controller arranged to control the machine with the rotatable tool holder, based on the output signal.

21. The system according to claim 20, wherein the controller is configured to displace the tool holder a distance axially away from the work piece, the distance corresponding to the axial displacement of the cutting tool, to compensate for the pull-out of the cutting tool.

22. The system according to claim 20, wherein the controller is configured to stop the rotation of the tool holder and thus the cutting tool when pull-out of the cutting tool is determined.

23. The system according to claim 20, wherein the controller is configured to release the cutting tool in the tool holder and stopping the rotation of the tool holder when pull-out of the cutting tool is determined.

24. The system according to claim 20, wherein the controller is configured to transmit a pull-out warning signal to a machine operator when pull-out of the cutting tool is determined.

* * * * *